United States Patent [19]

Kishida et al.

[11] 4,351,921

[45] Sep. 28, 1982

[54] RESIN COMPOSITION FOR USE IN UNCOATED EXTERIOR MATERIAL

[75] Inventors: Kazuo Kishida; Akira Hasegawa; Yasunori Kawachi, all of Ohtake, Japan

[73] Assignee: Mitsubishi Rayon Co., Ltd., Tokyo, Japan

[21] Appl. No.: 221,359

[22] Filed: Dec. 29, 1980

[30] Foreign Application Priority Data

Jan. 11, 1980 [JP] Japan .................................. 55-1943

[51] Int. Cl.³ ...................... C08L 33/08; C08L 33/12; C08L 51/04
[52] U.S. Cl. ........................................ 525/80; 525/71; 525/73; 525/82; 525/84; 525/85; 525/263; 525/296; 525/302; 525/305
[58] Field of Search ...................... 525/80, 82, 85, 71, 525/84, 73

[56] References Cited

U.S. PATENT DOCUMENTS 3,830,878  8/1974  Kato et al. ............................ 525/80

FOREIGN PATENT DOCUMENTS 52-30996  8/1977  Japan .................................. 525/80

Primary Examiner—J. Ziegler
Attorney, Agent, or Firm—Oblon, Fisher, Spivak, McClelland & Maier

[57] ABSTRACT

A resin composition for use in uncoated exterior materials markedly excellent in appearance and having high impact resistance and weather resistance wherein 10–70% by weight of a graft copolymer (I) having a high rubber content, 90–30% by weight of a rigid thermoplastic resin (II) comprising 10–90% by weight of at least one aromatic vinyl monomer and 90–10% by weight of at least one ethylenic unsaturated monomer having the following general formula:

$$CH_2=CRX$$

wherein R represents hydrogen or $CH_3$ group and X represents CN or $COOR_1$ group ($R_1$ represents alkyl group having 1–8 carbon atoms), and 0–50% by weight of a diene rubber-containing thermoplastic resin (III) are blended together so that the total amount of components (I) through (III) is 100% by weight, said graft copolymer (I) having a high rubber content being obtained by polymerizing 50–10% by weight of a monomer mixture (c) comprising 10–90% by weight of at least one aromatic vinyl monomer and 90–10% by weight of at least one ethylenic monomer having the following general formula:

$$CH_2=CRX$$

wherein R represents hydrogen or $CH_3$ group and X represents CN or $COOR_1$ group ($R_1$ represents alkyl group having 1–8 carbon atoms) in the presence of a latex of a crosslinked acrylic rubber having a multilayer structure which contains, in its particle, 5–30% by weight of a rigid crosslinked resin (a) having a core particle diameter of 0.25–0.40μ and of which outer layer part is constructed of 45–85% by weight of a crosslinked acrylic ester type polymer (b) constituted mainly of an acrylic ester, so that the total amount of components (a) through (c) is 100% by weight.

12 Claims, 1 Drawing Figure

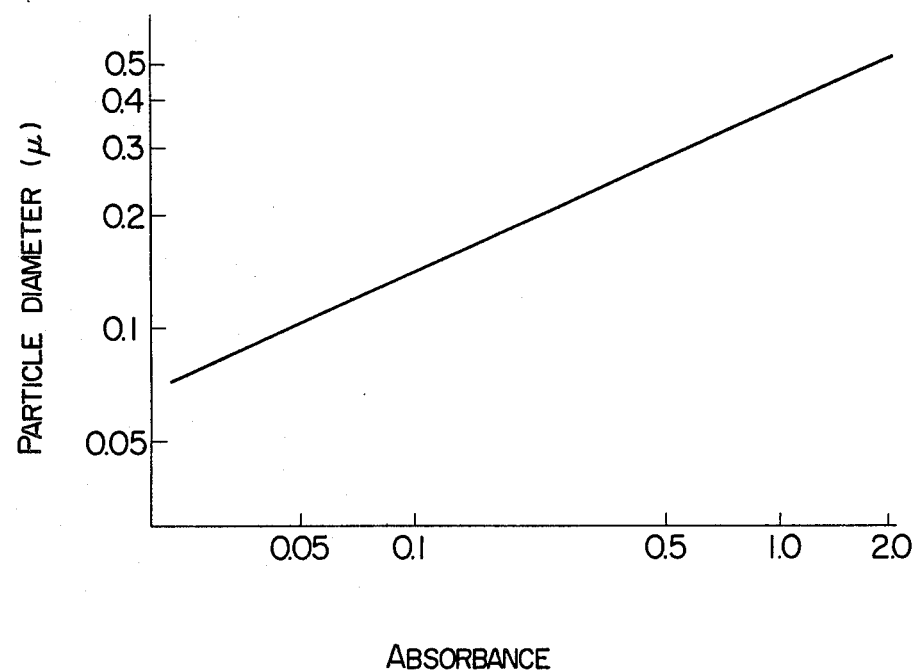

RESIN COMPOSITION FOR USE IN UNCOATED EXTERIOR MATERIAL

This invention relates to a resin composition for use in uncoated exterior materials markedly excellent in appearance and having impact resistance and weather resistance.

It has been usual hitherto to reinforce a rigid resin with an elastomer in order to give the resin an impact resistance. Though ABS resin is a typical instance of this sort of resins, it has a serious fault that it contains diene type rubber as the elastomer component so that it is poor in weather resistance and its outdoor use is limited. Though this fault can be somewhat overcome by adding an ultraviolet absorber or an antioxidant, the weather resistance of ABS resin cannot greatly be improved by such a technique. Accordingly, it is the present state of things that the surface of ABS resin is plated or coated to improve its weather resistance and to enable its outdoor use. However, such treatments of ABS resin surface necessitate many steps of processings and have a problem that they are apt to cause environmental pollutions. In the field of outdoor uses such as automobiles and domestic electric apparatuses used outdoors, therefore, it is particularly desired to develop a thermoplastic resin composition which can retain excellent appearance, impact resistance and weather resistance even if used outdoors for a long period of time without plating nor coating.

As a method for satisfying such a desire, the use of saturated rubber as the elastomer has been proposed in various manners. The use of acrylic ester rubber is its one example, about which many studies have been conducted hitherto. However, acrylic ester rubber has a fault that it is slower than diene rubber in elastic recovery, and if a resin composition comprising such a rubber and a rigid resin is injectoin-molded the rubber particles are markedly oriented and a pearl-like pattern is formed in the neighborhood of the gate of the molded product which is undesirable from the view-point of appearance and injures the commercial value.

The present inventors studied the problem that pearl-like pattern develops when acrylic ester rubber is used and found that the above-mentioned problem can be solved by letting a crosslinked resin exist inside the acrylic ester rubber particle, based on which a patent application was made previously. According to the subsequent study, however, when such a polymer is used gloss, hardness and weather resistance are somewhat lowered though the development of pearl-like pattern in the neighborhood of gate of molded product can be reduced considerably, so that sufficiently satisfactory characteristics cannot yet be exhibited in the above-mentioned special fields of use such as automobiles and outdoor domestic electric apparatuses.

In view of such a situation, the inventors conducted earnest studies with the aim of obtaining a resin composition which can be used outdoors for a long period of time without applying any plating nor coating treatment, such as those employed in ABS resin, to the surface of its molded product. As the result, it was found that a resin composition for use in uncoated exterior materials quite excellent in appearance and resistant to impact and weather enough to achieve the above-mentioned object can be obtained by combining, in respectively specified proportions, a graft copolymer having a high rubber content with a rigid resin otherwise obtained by suspension polymerization or the like and optionally further with a diene rubber-containing thermoplastic resin, said graft copolymer being obtained by graft-polymerizing a crosslinked acrylic rubber having a multi-layer structure which contains, in its particle, a specified quantity of rigid crosslinked resin having a core particle diameter falling in a specified range with a mixture of other monomers so that the proportion of said crosslinked acrylic rubber comes to 50% by weight or more. Based on this finding, this invention was accomplished.

Thus, the essentiality of this invention consists in a resin composition for use in uncoated exterior materials remarkably excellent in appearance and resistant to impact and weather wherein 10–70% by weight of a graft copolymer (I) having a high rubber content obtainable by polymerizing 50-10% by weight of a monomer mixture (c) comprising 10–90% by weight of at least one aromatic vinyl monomer and 90–10% by weight of at least one ethylenic unsaturated monomer having the following general formula:

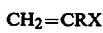

$CH_2=CRX$ wherein R represents hydrogen or $CH_3$ and X represents CN or $COOR_1$ ($R_1$ is alkyl group having 1-8 carbon atoms) in the presence of a latex of a crosslinked acrylic rubber having a multi-layer structure which contains, in its particle 5–30% by weight of a rigid crosslinked resin (a) having a core particle diameter of 0.25–0.40μ and of which outer layer is constituted of 45–85% by weight of a crosslinked acrylic ester polymer (b) constituted mainly of an acrylic ester so that the total amount of components (a) through (c) is 100% by weight, 90–30% by weight of a rigid thermoplastic resin (II) comprising 10–90% by weight of at least one aromatic vinyl monomer and 90–10% by weight of at least one ethylenic unsaturated monomer having the following general formula:

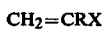

$CH_2=CRX$ wherein R is hydrogen or $CH_3$ and X is CN or $COOR_1$ ($R_1$ is alkyl group having 1-8 carbon atoms), and 0–50% by weight of a diene rubber-containing thermoplastic resin (III) are blended together so that the total amount of components (I) through (III) is 100% by weight.

When acrylic ester type rubbers were used in the prior techniques, the diameter of rubber particle had to be controlled so as to fall in the range of 0.1–0.3μ because the appearance of molded product changed with diameter of rubber particle and various problems such as lack of gloss, drop in impact strength and the like occurred depending on the diameter of rubber particle. Accordingly, in the process of the above-mentioned patent application wherein a crosslinked resin was let exist inside acrylic ester type rubber particle, it was necessary to control the particle diameter of crosslinked resin latex so as to become 0.24μ or less with consideration of the above-mentioned restriction on the rubber particle diameter.

On the contrary, the most important characteristic feature of this invention consists in that a resin composition excellent in appearance, gloss, impact strength, weather resistance etc. can be obtained by making the particle diameter of rigid crosslinked resin latex, constituting the core of crosslinked acrylic rubber particle having multi-layer structure, greater than the diameter in prior ones and, at the same time, employing the high rubber content blend method which comprises blending a graft polymer of high rubber content, obtainable by graft-copolymerizing the cross-linked acrylic rubber having multi-layer structure with a mixture of other monomers so that the proportion of the former is 50% by weight or more, with a rigid thermoplastic resin and optionally further with a diene rubber-containing thermoplastic resin. Such a fact that the above-mentioned excellent characteristics can be obtained by increasing the diameter of rigid crosslinked resin particle constituting the core and employing the high rubber content blend method has not hitherto been known in the field of resin compositions containing acrylic rubber as a main component, and it is a surprising fact.

Since the resin composition of this invention contains a core structure of rigid crosslinked resin inside the particle of crosslinked acrylic ester polymer rubber, the rubber particles do not easily aggregate at the time of molding and no pearl-like pattern develops in the neighborhood of the gate of molded product. Thus the resin composition of this invention assumes an excellent appearance and, at the same time, exhibits quite excellent resistances to impact, weather, etc.

Though the blend of high rubber content graft polymer and rigid thermoplastic resin, mentioned above, can exhibit the above-mentioned various excellent characteristics by itself, it can also be blended with a diene rubber-containing thermoplastic resin in an appropriate proportion, if necessary, to make the best of the characteristic features of both the materials. That is, an acrylic ester rubber has a higher glass transition point than diene rubber so that it is usually poor in impact strength in the low temperature range, and this can be improved by blending it with a diene rubber.

The rigid crosslinked resin (a) used in this invention which constitutes the core of the inner layer of multi-layer crosslinked acrylic rubber particle is not particularly limited so far as it is rigid at ordinary temperature and obtainable by the usual emulsion polymerization. Preferably, however, it is a product of crosslinking polymerization of the graft resin forming monomer, mentioned later, itself or the mixture thereof. As the crosslinking agent, crosslinking monomers having at least two non-conjugated C=C bonds including, for example, unsaturated acid esters of polyols such as ethylene glycol dimethacrylate and butanediol diacrylate; unsaturated alcohol esters of polybasic acids such as triallyl cyanurate and triallyl isocyanurate; divinyl compounds such as divinylbenzene; and unsaturated alcohol esters of unsaturated acids such as allyl methacrylate and diallyl phthalate, can be used. The amount of the crosslinking agent used is 0.01-3% by weight and preferably 0.1-2% by weight. If its amount is less than 0.01% by weight, a defect appears in the appearance of the molded product finally obtained. If it exceeds 3% by weight, flow property and impact strength drop undesirably. It is important in this invention to control the particle diameter of crosslinked resin latex so as to fall in the range of 0.25-0.40$\mu$ in preparing this rigid crosslinked resin. When the particle diameter of this core part is in the above-mentioned range, a high impact strength can be exhibited.

As the acrylic ester constituting the main component of the crosslinked acrylic ester polymer (b) constructing the outer layer part of the rubber particle, alkyl esters wherein the alkyl is $C_1$-$C_{12}$ alkyl such as methyl, ethyl, n-propyl, n-butyl, 2-ethylhexyl, n-lauryl or the like; aromatic esters such as benzyl acrylate and phenethyl acrylate; and the like can be used. In order that the polymer keeps as rubbery state below ordinary temperature, it is necessary to use said acrylic ester and preferably $C_1$-$C_8$ alkyl ester in an amount of 60% by weight or more based on the monomers constituting crosslinked acrylic ester polymer (b). As the monomer copolymerizable with these acrylic esters, methacrylic esters such as methyl methacrylate and n-butyl methacrylate, as well as acrylonitrile, styrene and the like can be referred to. This acrylic ester rubber is generally required to have a cross-linked network structure. In this invention also, it must form a crosslinked structure. In order to form a crosslinked structure, a crosslinking agent having at least two non-conjugated C=C bonds, of which examples include unsaturated acid esters of polyols such as ethylene glycol dimethacrylate and butanediol diacrylate; unsaturated alcohol esters of polybasic acids such as triallyl cyanurate and triallyl isocyanurate; divinyl compounds such as divinylbenzene and unsaturated alcohol esters of unsaturated acids such as allyl methacrylate and diallyl phthalate, is mixed as a crosslinking agent with a monomer or monomer mixture mainly comprising the above-mentioned acrylic ester and then polymerized. Otherwise, an organic peroxide such as benzoyl peroxide is added after the polymerization and heated in the state of latex. Combination of these two methods can also be employed.

In producing the multi-layer crosslinked acrylic rubber in the practice of this invention, the technique of the so-called seed polymerization is employed which comprises polymerizing 45-85% by weight of a mixture (b) consisting of a monomer or monomer mixture constituted mainly of the above-mentioned acrylic ester and the above-mentioned crosslinking agent in the presence of 5-30% by weight (as solid component) of the above-mentioned rigid crosslinked resin latex (a) having a particle diameter of 0.25-0.40$\mu$ under such a condition as to suppress the formation of new particles. Further, the post-cross-linking process can also be employed which comprises polymerizing said monomer or monomer mixture, then adding an organic peroxide so that the total amount of the organic peroxide and the monomer used is 45-85% by weight, and heating the whole in the state of a latex. From the viewpoint of physical properties, it is preferable that the multi-layer crosslinked acrylic rubber thus polymerized has a degree of swelling of about 5-15 and a gel content of about 85-95. For this reason, the crosslinking agent is appropriately added at the time of seed polymerization or post-crosslinking in such an amount as to give a degree of swelling and a gel content falling in the respective ranges mentioned above. Usually, it is appropriately added in an amount ranging from 0.1% to 10% by weight. Herein, the degree of swelling and the gel content of the multi-layer crosslinked acrylic rubber are measured in the following manner. Thus, a film is prepared from latex and dipped in methyl ethyl ketone at 30° C. for 48 hours. Degree of swelling and gel content can be expressed by $W_1/W_2$ and $W_2/W_0 \times 100$, respectively, wherein $W_0$ is the weight of film before dipping, $W_1$ is the weight of film after swelling and $W_2$ is the weight of absolutely dry film after swelling.

Next, in the presence of the multi-layer crosslinked acrylic rubber latex obtained by the above-mentioned process, 50-10% by weight of resin forming monomer mixture (c) comprising 10-90% by weight of at least one aromatic vinyl monomer and 90–10% by weight of at least one ethylenic unsaturated monomer having the aforementioned general formula $CH_2=CRX$ is graft-polymerized by adding said (c) into the latex either at once or in several portions or continuously in the presence of a radical forming initiator so that the total amount of rigid crosslinked resin (a), crosslinked acrylic ester polymer (b) and said resin forming monomer mixture (c) is 100% by weight, whereby graft polymer (I) is obtained. In this case, it is allowable to construct the resin part from several stages of grafts by variously changing the degree of grafting and the degree of polymerization or to employ the emulsion-suspension process for transforming the system from an emulsion system to a suspension system at the time of graft polymerization. By the multi-stage graft polymerization, impact strength and flow property of the finally obtained resin composition can be improved further.

As said aromatic vinyl monomer, styrene and α-methylstyrene can be referred to. As the compound of general formula $CH_2=CRX$, acrylonitrile, methacrylonitrile, and methyl, ethyl, propyl and butyl esters of acrylic acid and methacrylic acid, and the like can be referred to.

The degree of grafting of the grafted resin part (c) onto the multi-layer crosslinked acrylic rubber constituted of aforementioned (a) and (b) is preferably at least 10%. Herein, the degree of grafting is expressed by $(W_4-W_5)/W_5 \times 100$ when a graft polymer having a known weight $W_3$ is subjected to a direct refluxing in acetone at 70° C. for 2 hours, the insoluble fraction is isolated by centrifugation and its weight after absolute dryness is denoted by $W_4$. $W_5$ is the weight of multi-layer crosslinked acrylic rubber in the graft polymer weighing $W_3$.

It is one of the characteristic features of this invention that the proportion of multi-layer crosslinked acrylic rubber in the graft polymer (I) obtained by the above-mentioned process is specified in the range of 50–90% by weight, owing to which the resin composition of this invention for use in uncoated exterior materials having various excellent characteristics can be obtained.

Next, 10–70% by weight of the graft polymer (I) having a high rubber content thus obtained is blended with 90–30% by weight of rigid thermoplastic resin (II) otherwise produced to obtain various molding materials. Said rigid thermoplastic resin (II) is obtained by polymerizing a monomer mixture comprising 10–90% by weight of at least one aromatic vinyl monomer (its concrete examples are the same as above) and 90–10% by weight of at least one ethylenic unsaturated monomer having a general formula of $CH_2=CRX$ (its concrete examples are the same as above), of which concrete examples include styrene-acrylonitrile copolymer, α-methylstyrene-styrene-acrylonitrile copolymer, styrene-acrylonitrile-methyl methyacrylate copolymer and the like. Though the polymerization process of these rigid thermoplastic resins is not particularly limited, polymers obtained by suspension or bulk polymerization process are more advantageous to use in various properties such as hardness, gloss and the like.

The resin composition of this invention may be used in the form of the blended mixture itself of aforementioned graft polymer (I) and rigid thermoplastic resin (II). If necessary, however, it may be blended further with a diene rubber-containing thermoplastic resin (III) having a diene rubber content of at least 10% by weight so that the content of (III) of the total resin composition is 0–50% by weight and the total amount of components (I) through (III) is 100% by weight. As said diene rubber, polybutadiene, butadiene-styrene copolymer, butadiene-acrylonitrile copolymer and the like can be referred to. As a typical example of said diene rubber-containing thermoplastic resin, ABS resin can be referred to.

Depending on the object, various colorants, stabilizers to light and heat, inorganic or organic granular, powdery or fibrous fillers, foaming agents and the like may be added to the resin composition of this invention for use in uncoated exterior materials.

The resin composition of this invention for use in uncoated exterior materials can be molded according to various processing methods such as injection molding, extrusion molding, etc. and can be utilized as various molded products excellent in appearance, weather resistance, impact resistance, etc. and particularly as molded products for use in automobiles and domestic electric apparatuses used outdoors. It can also be utilized as a constitutional element, such as outermost laminate material, of other multi-layer structures.

This invention will be concretely illustrated with reference to examples infra. In the examples, % and parts are by weight unless otherwise referred to. The particle diameters were determined in the following manner. Thus, by using an uncrosslinked resin latex comprising methyl methacrylate/acrylonitrile/styrene (20/20/60% by weight), a calibration curve was prepared from the relation between electron microscopically determined particle diameter and absorbance of a dilution (0.5 g/liter) of the latex at a wavelength of 700 m$\mu$. Particle diameters of various latexes were determined by measuring their absorbances and reading out the diameters on the calibration curve. The calibration curve is shown in FIG. 1.

EXAMPLE 1

(A) Preparation of crosslinked resin latex 200 parts of deionized water was placed in a reaction vessel. After replacement with nitrogen, the temperature was elevated till the inner temperature reached 80° C. Into the vessel, 0.06 part of potassium persulfate was added and then the following mixture was continuously poured over a time period of 30 minutes:

| | |
|---|---|
| Methyl methacrylate (MMA) | 2.4 parts |
| Acrylonitrile (AN) | 2.4 parts |
| Styrene (St) | 7.2 parts |
| Triallyl isocyanurate (TAIC) | 0.06 part |
| Pelex OTP (dioctyl sulfosuccinate type emulsifier manufactured by Kao Atlas K.K.) | 0.3 part |

About one hour after pouring the mixture, the exothermic reaction was completed. The crosslinked resin latex thus obtained had a particle diameter of 0.26$\mu$.

(B) Preparation of multi-layer crosslinked acrylic rubber 0.24 part of potassium persulfate was added to the latex of crosslinked resin obtained in (A), after which the following mixture was poured thereinto continuously over a time period of 2 hours:

| | |
|---|---|
| n-Butyl acrylate (BuA) | 43.2 parts |
| AN | 4.8 parts |

| | -continued | |
|---|---|---|
| TAIC | | 0.24 part |
| Pelex OTP | | 0.30 part |

The crosslinked acrylic rubber thus obtained having said crosslinked resin as a core had a degree of swelling of 8.0, a gel content of 90% and a particle diameter of 0.30μ.

(C) Preparation of graft polymer

Subsequently, the following mixture was continuously poured into the crosslinked acrylic rubber latex of (B) over a time period of 2 hours:

| MMA | 8 parts |
|---|---|
| AN | 8 parts |
| St | 24 parts |
| n-Octylmercaptan | 0.04 part |
| Benzoyl peroxide | 0.20 part |

The latex thus obtained was poured into 5 times its amount of aqueous calcium chloride solution with stirring to coagulate it, after which it was made free from liquid, washed and dried to obtain a graft polymer having a high rubber content.

(D) Blending and evaluation of properties 50 parts of the graft polymer obtained in (C) was blended with 50 parts of suspension particles otherwise prepared by using a monomer mixture of MMA, AN and St (MMA/AN/St=20/20/60 (%)) so that the content of the multi-layer crosslinked acrylic rubber in the total resin composition was 30%. Further, 1 part of barium stearate and 0.1 part of Tinuvin P (ultraviolet absorber manufactured by Geigy Co.) were added to this resin composition, and the resulting mixture was pelletized by means of an extruder. Various test pieces were prepared from this pellet by injection molding, with which various properties were evaluated. The results are shown in Table 1. In Table 1, notched Izod impact strength was measured according to ASTM-D-256, melt index (MI) was determined by measuring the gram number of polymer flowing out during 10 minutes at 200° C. under a load of 5 kg, and surface gloss was determined by forming a flat plate having a thickness of ⅛ inch and measuring its specular gloss at incident and reflective angles of 60° according to ASTM-D523-62T. The same methods of evaluation are employed also in the examples and comparative examples mentioned later. Degree of swelling and gel content of crosslinked acrylic rubber were measured by the aforementioned methods.

EXAMPLES 2-3 and Comparative Examples 1-2

The procedures and evaluation mentioned in (A), (B), (C) and (D) of Example 1 were repeated, except that, in the procedure of (A), crosslinked resin latexes having different particle diameters were prepared. The results are also shown in Table 1.

TABLE 1

| No. | Particle diameter of crosslinked resin latex (μ) | Particle diameter of crosslinked acrylic rubber (μ) | Degree of swelling | Gel content (%) | Content of crosslinked acrylic rubber in the total resin composition | Notched Izod strength (kg-cm/cm²) | MI (g/10 min) | Surface gloss | Appearance of molded product (*) |
|---|---|---|---|---|---|---|---|---|---|
| Example 1 | 0.26 | 0.30 | 8 | 90 | 30 | 15 | 1.0 | 96 | o |
| Example 2 | 0.29 | 0.31 | 9 | 89 | 30 | 23 | 1.1 | 95 | ⊚ |
| Example 3 | 0.35 | 0.40 | 9 | 91 | 30 | 24 | 1.0 | 95 | ⊚. |
| Comparative Example 1 | 0.10 | 0.14 | 13 | 93 | 30 | 3 | 0.5 | 89 | Δ |
| Comparative Example 2 | 0.18 | 0.23 | 12 | 91 | 30 | 4 | 0.7 | 93 | Δ |

(*)
⊚: Excellent,
o: Good,
Δ: Passable,
x: Bad;
the marks mean the same in the subsequent examples and comparative examples also.

It is apparent from the results of Table 1 that the final resin composition is excellent in impact resistance when the particle diameter of crosslinked resin latex is greater than 0.25μ while it is poor in impact resistance when the particle diameter is smaller than 0.25μ. It is also understandable that flow property is bad and appearance of molded product is not good in the latter case.

EXAMPLES 4-8 and Comparative Examples 3-7

Graft polymers were prepared in the same manner as in Example 1, wherein the monomer composition of rigid crosslinked resin part (a) was AN/St/triallyl cyanurate (TAC)=25/75/0.5 (part), the monomer composition of crosslinked acrylic ester polymer part (b) was BuA/AN/TAC=90/10/0.5 (part), the monomer composition of graft resin part (c) was AN/St=25/75 (part), and the proportions of (a), (b) and (c) were varied as shown in Table 2. They were blended with suspension particles having a composition of AN/St=25/75 (part) so that the content of the multi-layer crosslinked acrylic rubber in the total resin composition was 30%. From these resin compositions, various test pieces were prepared in the same manner as in Example 1, with which their properties were evaluated. The results are shown in Table 2.

Comparative Example 3 is a case in which no resin core is present in the acrylic rubber particle, Comparative Examples 4-5 are cases in which the balance of multi-layer crosslinked acrylic rubber is not good, Comparative Example 6 is a case in which the content of multi-layer crosslinked acrylic rubber in the graft polymer is small, and Comparative Example 7 is a case in which the content of said rubber is large contrarily.

TABLE 2

| No. | Proportion in graft polymer (%) | | | Particle diameter of crosslinked resin latex (μ) | Content of crosslinked acrylic rubber in the total resin composition (%) | Notched Izod strength (kg-cm/cm²) | Surface gloss | Appearance of molded product |
| --- | --- | --- | --- | --- | --- | --- | --- | --- |
| | (a) | (b) | (c) | | | | | |
| Comparative Example 3 | 0 | 60 | 40 | — | 30 | 23 | 90 | x |
| Example 4 | 6 | 54 | 40 | 0.28 | 30 | 23 | 95 | o |
| Example 5 | 12 | 48 | 40 | 0.28 | 30 | 20 | 96 | ◎ |
| Comparative Example 4 | 24 | 36 | 40 | 0.30 | 30 | 9 | 93 | Δ |
| Example 6 | 20 | 60 | 20 | 0.30 | 30 | 17 | 95 | ◎ |
| Example 7 | 30 | 50 | 20 | 0.33 | 30 | 15 | 95 | o |
| Comparative Example 5 | 40 | 40 | 20 | 0.35 | 30 | 8 | 89 | Δ |
| Comparative Example 6 | 10 | 30 | 60 | 0.22 | 30 | 12 | 85 | x |
| Example 8 | 13 | 52 | 35 | 0.28 | 30 | 22 | 95 | ◎ |
| Comparative Example 7 | 30 | 65 | 5 | 0.33 | Incoagulable | — | — | — |

It is apparent from the results of Table 2 that, if the proportions of rigid crosslinked resin part (a), crosslinked acrylic ester polymer part (b) and graft resin part (c) in the graft polymer are out of the ranges specified in this invention, the balance of multi-layer crosslinked acrylic rubber becomes so bad as to deteriorate the impact resistance or the appearance of molded product.

EXAMPLE 9

By repeating the procedure of Example 1, a graft polymer was prepared, it was blended, various test pieces were prepared therefrom and various properties were evaluated, except that, in the procedure of (C) of Example 1, AN/St=10/30 (part) was used in place of MMA/AN/St=8/8/24 (part) as graft resin-forming monomer. The results are shown in Table 3.

EXAMPLE 10

By repeating the procedures of Example 1, various test pieces were prepared and various properties were evaluated, except that, in the procedure of graft polymerization of (C) in Example 1, a graft polymer was prepared by polymerization a mixture of graft resin forming monomer, mercaptan and benzoyl peroxide in two portions divided at a ratio of 60:40. The results are shown in Table 3. It is apparent from the results of Table 3 that the graft polymer obtained by the procedure of multi-stage graft polymerization in step (C) improves the impact resistance of the final resin composition.

EXAMPLES 11–13

By repeating the procedures of Example 1, graft polymers were prepared, they were blended, various test pieces were prepared therefrom and various properties were evaluated, except that the monomers used in the preparation of crosslinked resin latex in step (A) and in the preparation of graft polymer in step (C) were constituted as shown in the following table. The results are shown in Table 3.

| | (A) Crosslinked resin-forming monomer | | | (C) Graft resin-forming monomer | |
| --- | --- | --- | --- | --- | --- |
| Example 11 | MMA | 2.4 | parts | MMA | 8 parts |
| | AN | 2.4 | parts | AN | 8 parts |
| | St | 7.2 | parts | St | 24 parts |
| | TAC | 0.06 | part | | |
| Example 12 | MMA | 2.4 | parts | MMA | 8 parts |
| | AN | 2.4 | parts | AN | 8 parts |
| | St | 7.2 | parts | St | 24 parts |
| | Allyl methacrylate (AMA) | 0.06 | part | | |
| Example 13 | AN | 3 | parts | AN | 10 parts |
| | St | 9 | parts | St | 30 parts |
| | AMA | 0.06 | part | | |

EXAMPLE 14

By repeating the procedure of Example 1, various test pieces were prepared and various properties were evaluated, except that, in the blending procedure of step (D) of Example 1, 50 parts of graft polymer was blended with 50 parts of powdery rigid thermoplastic resin obtained from a monomer mixture of α-methyl-styrene/acrylonitrile/styrene=50/25/25 (%). The results are shown in Table 3.

EXAMPLES 15–16

By repeating the procedures of Example 1, various test pieces were prepared and various properties were evaluated, except that, in the blending procedure of step (D) of Example 1, a ternary blend system comprising ABS resin having a butadiene-styrene rubber content of 50% by weight in addition to graft polymer and rigid thermoplastic resin at a blending ratio of 10:50:40 (Example 15) or 10:30:60 (Example 16), in the mentioned order, was employed. The results are shown in Table 3.

EXAMPLE 17

By repeating the procedures of Example 1, various test pieces were prepared and various properties were evaluated, except that, in the procedure of step (D) of Example 1, graft polymer and suspension particles were blended together so that the content of multi-layer crosslinked acrylic rubber in the whole resin composition was 40%. The results herein obtained, as well as the results obtained by using the test pieces obtained in Example 1, are shown in Table 3.

In Table 3, impact weather resistance is expressed by the maintenance of Dynstat impact strength after accelerated sunshine exposure for 600 hours.

TABLE 3

| No. | Particle diameter of cross-linked resin latex (μ) | Content of crosslinked acrylic rubber in the total resin composition (%) | Content of butadiene-styrene rubber (%) | Notched Izod strength (kg-cm/cm²) 20° C. | Notched Izod strength (kg-cm/cm²) −20° C. | Surface gloss | Impact weather resistance (%) | Appearance of molded product |
|---|---|---|---|---|---|---|---|---|
| Example 9 | 0.26 | 30 | 0 | 18 | — | 95 | 90 | o |
| Example 10 | 0.26 | 30 | 0 | 17 | — | 95 | 90 | o |
| Example 11 | 0.28 | 30 | 0 | 17 | — | 96 | 90 | o |
| Example 12 | 0.25 | 30 | 0 | 15 | — | 96 | 90 | o |
| Example 13 | 0.30 | 30 | 0 | 23 | — | 95 | 90 | o |
| Example 14 | 0.26 | 30 | 0 | 15 | — | 95 | 90 | o |
| Example 15 | 0.26 | 30 | 5 | 35 | 7 | 96 | 80 | o |
| Example 16 | 0.26 | 18 | 5 | 21 | 6 | 94 | 50, | o |
| Example 17 | 0.26 | 40 | 0 | 41 | — | 94 | 90 | o |
| Example 1 | 0.26 | 30 | 0 | 15 | — | 96 | 90 | o |
| Commercial ABS resin | — | — | Unknown | 24 | 11 | 93 | 20 | o |

What is claimed is:

1. A resin composition for use in uncoated exterior materials markedly excellent in appearance and having high impact resistance and weather resistance wherein 10–70% by weight of graft copolymer (I) having a high rubber content, 90–30% by weight of a rigid thermoplastic resin (II) comprising 10–90% by weight of at least one aromatic vinyl monomer and 90–10% by weight of at least one ethylenic unsaturated monomer having the following general formula:

$$CH_2=CRX$$

wherein R represents hydrogen or $CH_3$ group and X represents CN or $COOR_1$ group ($R_1$ represents alkyl group having 1–8 carbon atoms), and 0–50% by weight of a diene rubber-containing thermoplastic resin (III) are blended together so that the total amount of components (I) through (III) is 100% by weight, said graft copolymer (I) having a high rubber content being obtained by polymerizing 50–10% by weight of a monomer mixture (c) comprising 10–90% by weight of at least one aromatic vinyl monomer and 90–10% by weight of at least one ethylenic monomer having the following general formula:

$$CH_2=CRX$$

wherein R represents hydrogen or $CH_3$ group and X represents CN or $COOR_1$ group ($R_1$ represents alkyl group having 1–8 carbon atoms) in the presence of a latex of a crosslinked acrylic rubber having a multi-layer structure which contains, in its particle, 5–30% by weight of a rigid crosslinked resin (a) having a core particle diameter of 0.25–0.40μ and of which outer layer part is constructed of 45–85% by weight of a crosslinked acrylic ester type polymer (b) constituted mainly of an acrylic ester, so that the total amount of components (a) through (c) is 100% by weight.

2. A resin composition for use in uncoated exterior materials according to claim 1, wherein said rigid crosslinked resin (a) is obtained by the crosslinking polymerization of (1) at least one aromatic vinyl monomer or (2) at least one ethylenic unsaturated monomer having a general formula, $CH_2=CRX$, wherein R and X are as defined above, or (3) a monomer mixture of said (1) and said (2).

3. A resin composition for use in uncoated exterior materials according to claim 2, wherein said crosslinking polymerization is carried out in the presence of 0.01–3% by weight of a crosslinking agent.

4. A resin composition for use in uncoated exterior materials according to claim 2, wherein said crosslinking agent is selected from the group consisting of unsaturated acid esters of polyols, unsaturated alcohol esters of polybasic acids, divinyl compounds and unsaturated alcohol esters of unsaturated acids.

5. A resin composition for use in uncoated exterior materials according to claim 1, wherein said crosslinked acrylic ester type polymer (b) is so constructed that alkyl ester having 1–8 carbon atoms occupies 60% by weight or more of the constitutional monomers.

6. A resin composition for use in uncoated exterior materials according to claim 1, wherein said crosslinked acrylic ester type polymer (b) is obtained by (1) mixing a crosslinking agent with the monomer and then polymerizing the mixture, or by (2) adding an organic peroxide after the polymerization, monomer and then heating the mixture, or by (3) combining the above-mentioned procedures (1) and (2).

7. A resin composition for use in uncoated exterior materials according to claim 6, wherein said crosslinking agent is selected from the group consisting of unsaturated acid esters of polyols, unsaturated alcohol esters of polybasic acids, divinyl compounds and unsaturated alcohol esters of unsaturated acids.

8. A resin composition for use in uncoated exterior materials according to claim 6, wherein the amount of said crosslinking agent or said organic peroxide is 0.1–10% by weight.

9. A resin composition for use in uncoated exterior materials according to claim 1, wherein said crosslinked acrylic rubber having a multi-layer structure constituted of (a) and (b) has a degree of swelling of 5–15 and a gel content of 85–95.

10. A resin composition for use in uncoated exterior materials according to claim 1, wherein said graft polymer (I) having a high rubber content is obtained by a multi-stage graft polymerization method wherein the monomer mixture (c) is added portionwise into the latex of the crosslinked acrylic rubber having a multi-layer structure.

11. A resin composition for use in uncoated exterior materials according to claim 1, wherein the degree of grafting of the monomer mixture (c) grafted onto the crosslinked acryl rubber having a multi-layer structure is at least 10%.

12. A resin composition for use in uncoated exterior materials according to claim 1, wherein the content of diene rubber in said diene rubber-containing thermoplastic resin is at least 10% by weight.

* * * * *